Patented Apr. 9, 1946

2,398,105

UNITED STATES PATENT OFFICE 2,398,105

POLYMERIZATION OF BUTADIENES

Gerry P. Mack, Jackson Heights, N. Y., assignor to Advance Solvents & Chemical Corporation, New York, N. Y., a corporation of New York No Drawing. Application February 26, 1944, Serial No. 524,103

7 Claims. (Cl. 260—84.5)

My present invention relates to an improved process of emulsion polymerizing butadienes-1,3 alone or in mixtures with other vinyl compounds capable of forming in aqueous emulsions solid copolymerisates with butadienes-1,3, such as styrene, acrylonitrile and others. The term butadienes-1,3 as used in the present specification and claims is intended to include the unsubstituted butadiene as well as homologues and substitution products thereof such as isoprene, 2-chloro-butadiene-1,3, 2-bromo-butadiene-1,3, pentadiene and its derivatives and others as well as mixtures of these in the monomeric phase.

Butadienes-1,3 can be readily polymerized but their polymerizates have a tendency to be tough and insoluble in benzene and to partake more of the properties of a cured or vulcanized rubber rather than of those of an unvulcanized crude rubber. Consequently, these polymers are difficult to mill or work on the usual crude rubber machines and offer difficulties in the incorporation of fillers and other adjunctives necessary for vulcanization. As a result the vulcanized products from such polymers have inferior mechanical properties.

In order to avoid these disadvantages, it has been proposed to effect the polymerization of butadienes-1,3 (in emulsions or solutions or by heat) in the presence of modifiers or regulators. These regulators are chemicals which when added in small quantities, e. g. in amounts of about 1% by weight, have a profound effect on the resulting polymer obtained. Regulators known heretofore are for instance sulfur and certain sulfur-containing compounds such as the mercaptans having the structure R—SH where R has at least 6 carbon atoms. The dodecyl mercaptan is at present most widely used and seems to give best results.

Other sulfur compound regulators which have been tried heretofore, are certain organic disulfides, such as the di-alkyl xanthogendisulfides, and particularly di-isopropyl xanthogendisulfide.

However, the use of these known sulfur compound regulators was connected with certain serious disadvantages. For instance the mercaptans improve the butadiene polymers and copolymers from the standpoint of solubility, plasticity and workability, but they retard the course of the polymerization reaction considerably and, however, the use of the mercaptan compounds may result in the formation of undesirable dimeric by-products. Unless the amount of the mercaptan regulators is very carefully controlled, not only may the polymerization reaction be unduly retarded but also undesirably soft stocky plastics of low molecular weight will be obtained instead of rubbery polymers.

The organic disulfides, on the other hand, though they do not retard the polymerization as much as the mercaptans, fail to produce a satisfactory regulatory effect and do not give sufficient plasticity to the polymer.

It is the principal object of my invention to overcome these disadvantages and to develop a process which permits the preparation of butadiene-1,3 polymers and of copolymers of butadienes-1,3 with copolymerizable vinyl derivatives without retarding the course of the polymerization and in nearly quantitative yields of rubbery polymers which have good working qualities on a mill and also give vulcanizates of excellent resilience.

According to my invention these and other objects, which will appear more clearly as the description proceeds, are accomplished by conducting the polymerization in an aqueous emulsion in the presence of a small quantity of a paraffin complex sulfur regulator in the form of a sulfuretted commercial paraffin hydrocarbon (wax or oil) which is substantially a mixture of 14 to 32 carbon atom paraffins and contains an average of from about 18 to about 26 carbon atoms in the molecule with between about 9% and 17.5% by weight of sulfur attached at random to the carbon atoms of the paraffins in the form of divalent sulfur groups. The terms "sulfuretted" and "sulfurating," as used in the present specification and claims, refer to the combination of the hydrocarbon compounds with divalent sulfur groups.

The process according to my invention may be carried out successfully with as little as about 0.47% of the paraffin complex sulfur regulator calculated on the monomeric substances to be polymerized. I have also found that larger quantities of my paraffin complex sulfur regulators, e. g. up to about 2% by weight of the monomers, may be used without causing an undue retardation of the reaction or excessive decrease in yield and without impairment of the quality of the product as has been observed when the polymerization was effected with corresponding quantities of the prior art regulators. Another advantage of my new process is that polymerizates obtained by means of my paraffin complex sulfur regulators after incorporation of the usual rubber adjunctives and vulcanization, yield products which have improved physical properties over similar products prepared with regulators used in the prior art. Generally, in my new process using paraffin complex regulators, the yield of useful, rubbery polymerizates which can be worked and milled on the usual crude rubber machines is at least equal to and frequently much higher than that obtained from a similar process carried out with a corresponding quantity of any of the prior art regulators.

In a preferred embodiment of my invention, I use paraffin complex sulfur regulators of the type described which, in addition to the bivalent sulfur, contain a small amount, e. g., between about 1.6% and 5% by weight of chlorine attached at random to the carbon atoms of the paraffins. The chlorine content, however, is not an essential element of my paraffin complex sulfur regulators.

The paraffin complex sulfur regulators used in my polymerization process may be prepared by starting from a commercial paraffin wax or oil consisting essentially of a mixture of various paraffins containing from 14 to 32 carbon atoms in the molecule, the average carbon atom content of the mixture being between 18 and 26. The paraffins in such a mixture may be either all straight chain or all branched chain compounds or they may consist partly of straight chain and partly of branched chain molecules.

This starting material is contacted at a suitable elevated temperature with chlorine gas until between 14% and 30% by weight of chlorine have been absorbed in the mixture. Then, the chlorinated product is sulfurated, e. g. with an alkali metal hydrosulfide, until most or all of the chlorine has been substituted by divalent sulfur groups. The sulfur content of the final product is between about 9% and 17.5% by weight and depends to a large extent on the chlorine content of the chlorinated material which is subjected to sulfuration.

The regulators used according to the present invention differ structurally from the mercaptans proposed in the prior art (see U. S. Patent 2,281,613), because the prior art regulators were exclusively primary mercaptans, i. e. alkyl hydrosulfides having a hydrosulfide group in the terminal position, of specific definite alkyl compounds, e. g. dodecyl mercaptan.

Contrary hereto, the paraffin complex sulfur regulators used according to the present invention are complex commercial mixtures of various paraffins within a certain range and the divalent sulfur groups are attached at random to the carbon atoms of the various paraffins in the mixture. This is based on the fact that the substitution of chlorine in the starting material of my invention is nearly random and all possible configurations are represented. The relative ratio of formation of primary and secondary chlorine derivatives of paraffins under the conditions employed is given by Groggins (Unit Processes in Organic Synthesis, page 168) as 1 to 2. Since only 10% of the carbons in the paraffin mixture used as starting material are terminal, it is evident that the proportion of primary mercaptans present in the final product is quite small. Moreover, in my paraffin complex sulfur regulators, only part (between about 1.8 and 68%) of the total divalent sulfur present is random attached to the carbon atoms of the paraffins in the form of hydrosulfide groups, the remaining sulfur being most probably in the sulfide form.

The following examples may serve to illustrate without limiting the invention.

Example 1

A commercial white scale wax having a melting point of 52 to 54° C. and a molecular weight of approximately 300 and consisting of a mixture of mainly straight chain paraffin compounds containing from 16 to 24 carbon atoms, the average being about 21 carbon atoms, was contacted with chlorine gas at a temperature of about 88° C. until it contained 14.5% by weight of chlorine. 540 gms. of caustic soda were dissolved in 250 ml. of water and saturated with 460 gms. hydrogen sulfide. The resulting sodium hydrosulfide was charged into a pressure vessel together with 3000 gms. of the chlorinated wax and 14,400 gms. of 190 proof alcohol. The reaction mixture was heated to 90° C. and held at this temperature under constant agitation for 40 hours. After distillation of the alcohol, the stock was diluted with petroleum thinner and filtered to remove salts. The thinner was then distilled off in vacuo. A yield of 2700 gms. of reduced stock was obtained.

Upon analysis of the product, which will hereafter be identified as "Sample No. 1," the following data were obtained:

Sample No. 1

| | |
|---|---|
| Chlorine (% of total weight) | 1.6 |
| Total sulfur (% of total weight) | 9.3 |
| Sulfur in hydrosulfide groups (% of total weight) | 6.3 |
| Sulfur in hydrosulfide groups (% of total sulfur) | 68.0 |

Example 2

A commercial white scale wax as used in Example 1 was contacted with chlorine gas at a temperature of about 88° C. until it contained 25.7% by weight of chlorine. The chlorinated wax was then sulfurated in the manner described in Example 1.

An analysis of the product, hereafter identified as "Sample No. 2" yielded the following data:

Sample No. 2

| | |
|---|---|
| Chlorine (% of total weight) | 2.5 |
| Total sulfur (% of total weight) | 16.4 |
| Sulfur in hydrosulfide groups (% of total weight) | 11.0 |
| Sulfur in hydrosulfide groups (% of total sulfur) | 67.0 |

Example 3

A white ceresin wax having a melting point of 61° C. and a molecular weight of approximately 365 and consisting of a mixture of normal and iso-paraffin compounds containing from 20 to 32 carbon atoms, the average being about 26 carbon atoms, was contacted with chlorine gas, as described in Example 1, until it contained 30% by weight of chlorine. The chlorinated wax was then sulfurated as in Example 1.

The sulfur and chlorine contents of the product, hereafter called "Sample No. 3" were as follows:

Sample No. 3

| | |
|---|---|
| Chlorine (% of total weight) | 5.0 |
| Total sulfur (% of total weight) | 17.5 |
| Sulfur in hydrosulfide groups (% of total weight) | 3.5 |
| Sulfur in hydrosulfide groups (% of total sulfur) | 20.0 |

Example 4

A highly refined paraffin burning oil consisting of a mixture of normal and iso-paraffin compounds containing from 16 to 22 carbon atoms, the average being about 19 carbon atoms, was chlorinated according to Example 1 until it contained 14% by weight of chlorine. The chlorinated oil was reacted with sodium hydrosulfide, as described in Example 1. The sulfuretted product, "Sample No. 4," had the following composition:

*Sample No. 4*

| | |
|---|---|
| Chlorine (% of total weight) | 2.00 |
| Total sulfur (% of total weight) | 9.00 |
| Sulfur in hydrosulfide groups (% of total weight) | 0.14 |
| Sulfur in hydrosulfide groups (% of total sulfur) | 1.5 |

EXAMPLE 5

A kerosene fraction of petroleum consisting of a mixture of paraffin compounds containing from 14 to 22 carbon atoms, the average being about 18 carbon atoms, was chlorinated to a chlorine content of 28% by weight, and then converted to its sulfur derivatives as in Example 1.

The product was called "Sample No. 5" and had the following characteristics:

*Sample No. 5*

| | |
|---|---|
| Chlorine (% of total weight) | 4.5 |
| Total sulfur (% of total weight) | 16.5 |
| Sulfur in hydrosulfide groups (% of total weight) | 0.65 |
| Sulfur in hydrosulfide groups (% of total sulfur) | 4.0 |

The following examples may serve to illustrate the efficiency of and the superior results obtained with my new process of polymerizing butadienes-1,3 and mixtures of these monomeric dienes with other copolymerizable vinyl derivatives in the presence of the new regulators according to Examples 1 to 5. The comparative tests were made with dodecyl mercaptan which is at present the most widely used regulator in polymerization reactions of this type.

EXAMPLE 6

| | Parts by weight |
|---|---|
| Butadiene-1,3 | 75.0 |
| Styrene | 25.0 |
| Sodium oleate | 2.5 |
| Sodium stearate | 2.5 |
| Potassium persulfate | 0.25 |
| Water | 80.00 |
| Regulator | Varied |

The above is a typical formula for a synthetic rubber copolymer. The ingredients were stirred with various amounts of regulators until emulsified, and, while continuing the stirring, the monomers were polymerized by heating to 45° C. for 7 hours.

The following table shows the results obtained with my complex paraffin sulfur compounds compared with those obtained with equal quantities of dodecyl mercaptan.

| | Product type of regulator | Amount of regulator in per cent of polymerizable polymers | Per cent yield of polymer | Character of polymer |
|---|---|---|---|---|
| 1 | (a) Dodecyl mercaptan | 0.5 | 75 | Rubbery, soft, workable. |
| | (b) Sample No. 1 | 0.5 | 75 | Do. |
| 2 | (a) Dodecyl mercaptan | 1.0 | 87 | Rubbery, workable, slightly sticky. |
| | (b) Sample No. 1 | 1.0 | 90 | Rubbery, soft, workable. |
| 3 | (a) Dodecyl mercaptan | 2.0 | 45 | Sticky, plastic. |
| | (b) Sample No. 1 | 2.0 | 68 | Rubbery, soft, workable. |

From the above table it can be seen that the results obtained with my regulator Sample No. 1 were equivalent to those obtained with dodecyl mercaptan where the amount of regulator was 0.5% by weight of the material to be polymerized. With the use of 1% by weight of regulator the results according to the present invention were superior to those of a polymerization in the presence of 1% dodecyl mercaptan with regard to the yield as well as to the characteristics of the product. The total yield was considerably higher than in the case where 0.5% of regulator were used. A further increase in the amount of Sample No. 1 to 2% still produced a high yield (68%) of a good rubbery polymer whereas in the comparative test made with 2% dodecyl mercaptan the yield fell from 87% to 45% and the product was no longer a rubbery polymer but a soft sticky plastic having none of the essential characteristics of a synthetic rubber.

In order to compare the vulcanizates of the rubbery polymers obtained in the process according to my invention with those of the polymers resulting from a comparable prior art process, the products 2a and 2b of the above table were milled up in the usual manner with equal amounts of adjunctives as follows:

| | Parts by weight | Parts by weight |
|---|---|---|
| Product 2a | 100 | |
| Product 2b | | 100 |
| Coal tar oil | 10 | 10 |
| Zinc oxide | 5 | 5 |
| Sulfur | 2 | 2 |
| Stearic acid | 2 | 2 |
| Carbon black | 50 | 50 |
| Mercapto benzothiazole | 1.5 | 1.5 |

Both mixtures were vulcanized in the same conventional process at a temperature of about 142° C. for 45 minutes. A comparison of the physical properties of the vulcanizates gave the following results:

| Vulcanizate of— | Product 2a | Product 2b |
|---|---|---|
| Ten. str | 2050 | 2470 |
| Percent elong. max | 350 | 375 |
| Mod. @ 300 | 1590 | 2045 |
| Shore Duro | 70 | 80 |
| Schopper rebound | 30 | 36 |

The superior physical properties obtained with my new process and regulators can readily be seen. The increased resiliency as well as the better tensile strength and greater modulus are particularly important factors.

EXAMPLE 7

An emulsion was produced by stirring together the following ingredients:

| | Parts by weight |
|---|---|
| Butadiene-1,3 | 100 |
| Sodium oleate | 2.5 |
| Sodium stearate | 2.5 |
| Potassium persulfate | 0.25 |
| Water | 80.00 |
| Regulator Sample No. 2 | 1.00 |

After emulsification the mixture was polymerized for 10 hours at 50° C. There were obtained 89% of a rubbery polymer slightly tougher than the product 2b of Example 6.

EXAMPLE 8

The following ingredients were stirred together:

| | Parts by weight |
|---|---|
| Butadiene-1,3 | 60 |
| Isoprene | 40 |
| Sodium oleate | 2.5 |
| Sodium stearate | 2.5 |
| Water | 100.0 |
| Regulator Sample No. 3 | 1.0 |

When the mixture had emulsified it was polymerized for 8 hours at 52° C. The yield was 85% of a rubbery polymer which could be milled and worked easily on a conventional rubber kneading machine.

EXAMPLE 9

A monomeric emulsion was prepared from the following ingredients:

| | Parts by weight |
|---|---|
| Butadiene-1,3 | 75 |
| Methyl pentadiene | 25 |
| Sodium stearate | 4.5 |
| Ammonium persulfate | 0.3 |
| Water | 85.0 |
| Regulator Sample No. 4 | 1.0 |

The emulsion was polymerized for 15 hours at 55° C. and yielded 87% of a rubbery polymer suitable for milling and working.

EXAMPLE 10

The following ingredients were stirred together:

| | Parts by weight |
|---|---|
| 2 chloro-butadiene-1,3 | 75 |
| Myrcene | 25 |
| Sodium oleate | 5 |
| Potassium persulfate | 0.25 |
| Water | 90.00 |
| Regulator Sample No. 5 | 1.00 |

Stirring was continued until an emulsion had been formed and, thereafter, the mixture was heated to 58° C. and kept at this temperature under constant agitation for 8 hours. The yield of polymer was 88% in the form of a soft rubbery polymer suitable for milling and working on ordinary crude rubber machines.

EXAMPLE 11

To show the action of various regulators on an acrylonitrile-butadiene mixture without a catalyst, the following emulsions were prepared:

| | Parts by weight | | |
|---|---|---|---|
| Butadiene-1,3 | 75.0 | 75.0 | 75.0 |
| Acrylo nitrile | 27.0 | 27.0 | 27.0 |
| Sodium oleate | 2.4 | 2.4 | 2.4 |
| Sodium stearate | 2.4 | 2.4 | 2.4 |
| Sodium salt of a condensed aromatic sulfonic acid | 0.6 | 0.6 | 0.6 |
| Water | 300.0 | 300.0 | 300.0 |
| Regulator Sample No. 1 | 0.48 | | |
| Regulator Sample No. 2 | | 0.48 | |
| Dodecyl mercaptan | | | 0.48 |

Polymerized at 60° C. for 15 hours

| | | | |
|---|---|---|---|
| Product | 1 | 1 | 1 |
| Yield per cent | 88 | 75 | 57 |

[1] Soft, rubbery, workable.

EXAMPLE 12

The following ingredients were stirred together:

| | Parts by weight |
|---|---|
| Butadiene-1,3 | 58 |
| Styrene | 19 |
| Methylpentadiene | 19 |
| Acrylonitrile | 4 |
| Sodium oleate | 3 |
| Sodium stearate | 2 |
| Potassium persulfate | 0.25 |
| Water | 200 |
| Regulator Sample No. 1 | 1 |

Stirring was continued until an emulsion had been formed which was then heated to 60° C. and kept at this temperature under agitation for 18 hours. The yield was 90% of a rubbery polymer suitable for milling.

EXAMPLE 13

The following ingredients were stirred together until a homogeneous emulsion had been formed:

| | Parts by weight |
|---|---|
| Butadiene-1,3 | 55 |
| Methylpentadiene | 25 |
| Acrylonitrile | 20 |
| Sodium oleate | 2 |
| Sodium stearate | 2.5 |
| Water | 200 |
| Regulator Sample No. 2 | 1 |

The emulsion was kept under constant stirring for 18 hours at a temperature of 50° C. The yield of polymer was 90% of a soft rubbery mass which could be milled on an ordinary rubber working machine.

I claim:

1. In a process of emulsion polymerizing a monomeric material selected from the group consisting of the butadienes-1,3 and the mixtures thereof with other vinyl compounds capable of forming solid copolymerisates with butadienes-1,3 in aqueous emulsions, the step of conducting the polymerization in the presence of a paraffin complex sulfur regulator in the form of the sulfuretted commercial paraffin hydrocarbons which are substantially mixtures of 14 to 32 carbon atom paraffins and contain an average of from about 18 to about 26 carbon atoms in the molecule with between about 9% and 17.5% by weight of sulfur attached at random to the carbon atoms of the paraffins in the form of divalent sulfur groups.

2. A process, as claimed in claim 1, in which the paraffin complex sulfur regulator contains between 1.8 and 68% by weight of its total sulfur content in the form of random attached hydrosulfide groups.

3. A process, as claimed, in claim 1, in which the paraffin complex sulfur regulator is present in the polymerization mixture in an amount between about 0.47 and 2% calculated on the weight of the monomeric substances to be polymerized.

4. In a process of emulsion polymerizing a monomeric material selected from the group consisting of the butadienes-1,3 and the mixtures thereof with other vinyl compounds capable of forming solid copolymerisates with butadienes-1,3 in aqueous emulsions, the step of conducting the polymerization in the presence of a paraffin complex sulfur regulator in the form of a chlorinated and sulfuretted commercial paraffin hydrocarbon which is substantially a mixture of 14 to 32 carbon atom paraffins and contains an average of from about 18 to about 26 carbon atoms in the molecule with between 9% and 17.5% by weight of divalent sulfur and between 1.6% and 5% by weight of chlorine attached at random to the carbon atoms of the paraffins.

5. In a process of emulsion polymerizing a monomeric material selected from the group consisting of the butadienes-1,3, and the mixtures thereof with other vinyl compounds capable of forming solid copolymerisates with butadienes-1,3 in aqueous emulsions, the step of conducting the polymerization in the presence of a paraffin complex sulfur regulator obtained by sulfuretting a chlorinated commercial paraffin hydrocarbon which is substantially a mixture of 14 to 32 carbon atom paraffins and contains an average of from about 18 to about 26 carbon atoms in the molecule with about 14% to 30% by weight of chlorine attached at random to the carbon atoms of the paraffins.

6. In a process of emulsion polymerizing a butadiene-1,3 styrene mixture in water emulsion in the presence of an emulsifying agent and a polymerization catalyst, the step of conducting the polymerization in the presence of between 0.5 and 2% calculated on the weight of the butadiene-1,3 styrene mixture of a chlorinated and sulfuretted commercial paraffin scale wax having before chlorination and sulfuration a melting point between 52 and 54° C. and a molecular weight of approximately 300 and containing 1.6% by weight of chlorine and 9.3% by weight of divalent sulfur attached at random to the carbon atoms of the paraffins, about 68% of the total sulfur content being in the form of random attached hydrosulfide groups.

7. In a process of emulsion polymerizing a butadiene-1,3 acrylo nitrile mixture in water emulsion in the presence of an emulsifying agent and in the absence of a polymerization catalyst, the step of conducting the polymerization in the presence of 0.47% calculated on the weight of the butadiene-1,3 acrylo nitrile mixture of a chlorinated and sulfuretted commercial paraffin scale wax having before chlorination and sulfuration a melting point between 52 and 54° C. and a molecular weight of approximately 300 and containing between 1.6% and 2.5% by weight of chlorine and between 9.3% and 16.4% by weight of divalent sulfur attached at random to the carbon atoms of the paraffins, about 67 to 68% of the total sulfur contents being in the form of random attached hydrosulfide groups.

GERRY P. MACK.